Patented Nov. 26, 1935

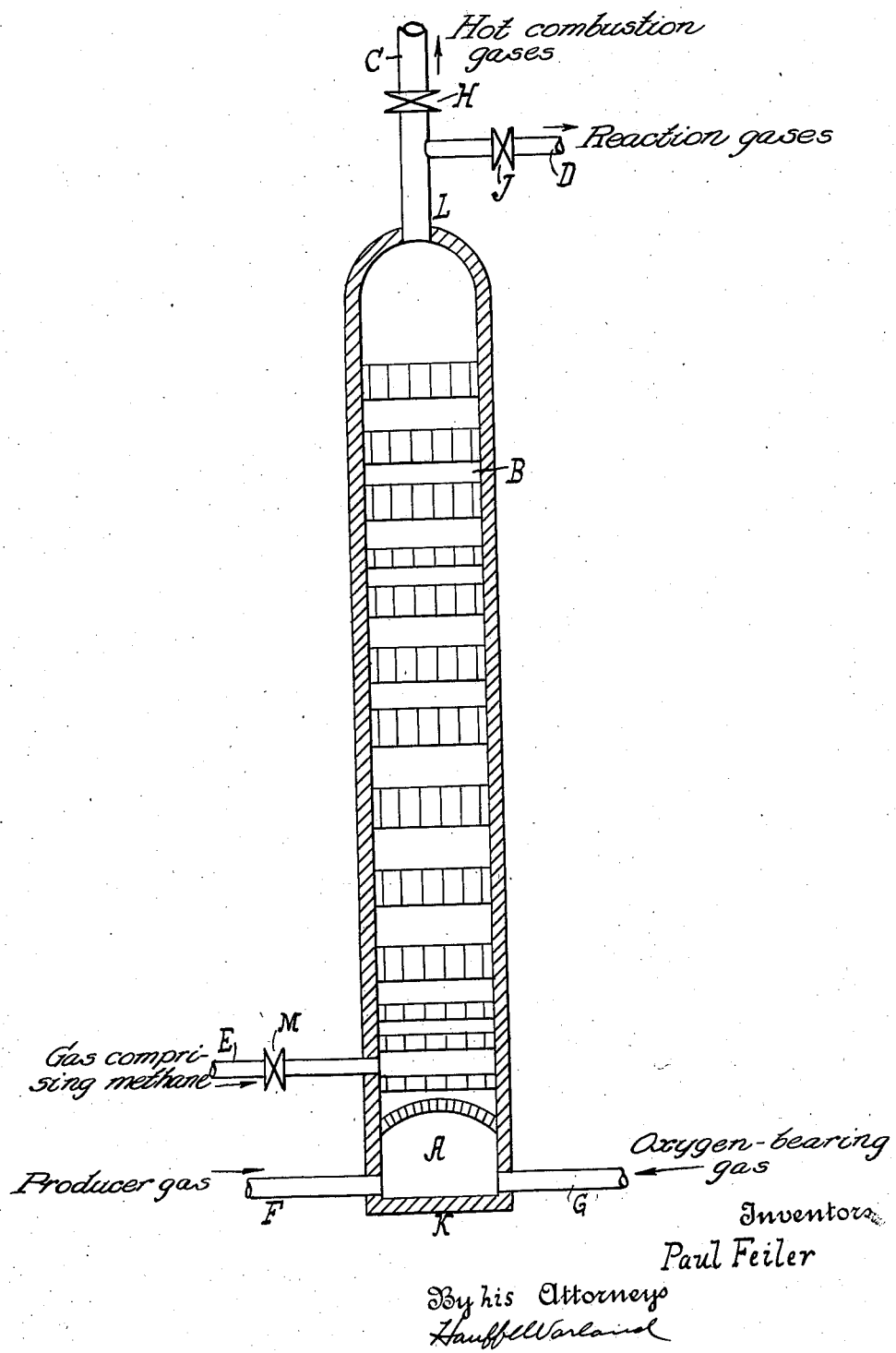

2,022,279

UNITED STATES PATENT OFFICE 2,022,279

PRODUCTION OF OLEFINES AND LIQUID HYDROCARBONS FROM METHANE

Paul Feiler, Ludwigshafen-on-the-Rhine, Germany, assignor to I. G. Farbenindustrie Aktiengesellschaft, Frankfort-on-the-Main, Germany Application February 16, 1931, Serial No. 515,972
In Germany February 28, 1930

1 Claim. (Cl. 260—170)

The present invention relates to the production of olefines and liquid, more especially aromatic hydrocarbons, which are hereinafter referred to for the sake of brevity as hydrocarbons containing double bonds in the molecule, from methane.

I have found that particularly high yields of hydrocarbons containing double bonds in the molecule are obtained by thermally treating methane or a gas comprising methane in the presence of a material comprising silicon carbide.

The said material comprising silicon carbide may be employed for the construction of the apparatus or as a filling material for the apparatus. For example, tubes, shaft furnaces or Cowpers may be constructed of the said material. A material comprising silicon carbide may in particular be employed for constructing the heat regenerators in the said Cowper apparatus.

Among the materials comprising silicon carbide coming into question in accordance with the present invention may be mentioned in the first place, silicon carbide itself or a material containing more than 20 per cent and preferably more than 60 per cent of silicon carbide. Usually the materials employed will contain between 60 and 95 per cent of silicon carbide. The remainder consists of binding agents among which those readily melting, such as feldspars and cryolites or other readily melting silicates or fluor spar, have proved to be particularly advantageous.

Among the gases to be treated according to the present invention may be mentioned methane itself or gas mixtures containing methane, such as mixtures thereof with homologues of methane, such as ethane or propane or butane, or natural gas, coke oven gas or other gases obtained by degasification of carbonaceous materials, cracking gases or waste gases of the destructive hydrogenation of carbonaceous materials. The methane fractions obtained by the fractionation of such gas mixtures may also be employed. In all cases the initial gases should contain at least 20 per cent of methane.

The conversion of methane in accordance with the present invention is usually carried out at temperatures of between 900° and 1300° C. The higher the concentration of methane in the initial gases, the lower is the temperature required. Thus, if the initial gas contains more than 70 per cent of methane temperatures of between about 1000° and 1100° C. are very suitable for the conversion. With more dilute gases temperatures of between 1200° and 1300° C. are very suitable.

When treating a gas mixture comprising both methane and its higher homologues, such as ethane, propane and butane it is preferable first to treat the said gas mixture at temperatures below 900° C., for example at between 700° and 900° C. and then in a second stage, after the removal of the hydrocarbons containing double bonds in the molecule produced, to treat the residual gas at temperatures of between 900° and 1300° C. This method of working is employed because the homologues of methane are converted at temperatures of between 700° and 900° C. in accordance with the present invention into hydrocarbons containing double bonds in the molecule, whereas at higher temperatures an undesirable production of carbon, hydrogen and methane takes place. On the other hand methane is not converted at temperatures lower than 900° C. in substantial amounts into products of the nature obtained in accordance with the present invention.

The process in accordance with the present invention is carried out with patricular advantage by operating in a chamber constructed of a material comprising silicon carbide and filled with chequer work of the same material and alternately heating up the said chequer work to the desired temperature of between about 900° and 1300° C. by passing hot gases, such as hot combustion gases or hot producer gas therethrough, and passing methane or gases comprising methane through the chambers thus heated up.

The process according to the present invention is usually carried out at atmospheric or slightly elevated pressure. Higher pressures are also advantageous where pressure-resistant apparatus is available, since in this manner a higher throughput is attained.

It has been found advantageous to work with such a high rate of flow of the gases that the methane is only partially decomposed since in this manner the formation of soot and of hydrogen is suppressed in a marked degree. The methane contained in the residual gas is preferably recovered by scrubbing said gas with a mineral or tar oil under pressure and is then again subjected to the said treatment.

In order to have an efficient heat economy the fresh gases are preferably passed in counter-current to the effluent reaction gases. In the heat exchange apparatus employed for this purpose the temperature is usually maintained so low that iron may be employed for the construction of the said exchange apparatus. The said principle of heat exchange may be applied with particular advantage when working with several chambers arranged in series.

The following example which is with reference to the accompanying drawing will further illustrate how the said invention may be carried out in practice but it should be understood that the invention is not limited to the said example nor to operations carried out in the specific type of apparatus illustrated.

The drawing shows diagrammatically in elevation and partly in section a Cowper for a treatment of gases comprising methane.

Referring to the drawing, the Cowper has a height from K to L of 6.25 meters and the chequer work B consists of 400 kilograms of a material containing 90 per cent of silicon carbide, the remainder being a binding agent of feldspathic nature. The said material is periodically heated up to a temperature of about 1100° C. by burning in the chamber A producer gas introduced thereinto by means of the pipe F with the aid of an oxygen-bearing gas introduced by way of the pipe G. The hot gases of combustion pass off at C, the valves J and M being kept closed. After each heating period the valve H is closed and the valves J and M are opened and a gas comprising 90 per cent of methane is introduced at D. In all 15 cubic meters of the said gas comprising methane are passed through hourly. The reaction products are withdrawn at E and contain after a single passage for each cubic meter of the initial gas passed through 45 grams of a condensate consisting to the extent of about 45 per cent of benzene, about 12 per cent of toluene, xylene and alkyl naphthalenes, the remainder consisting mainly of naphthalene. The residual gas, the volume of which has increased by about 20 per cent has approximately the following composition:

| | Per cent |
|---|---|
| Carbon dioxide | 0.4 |
| Olefines and acetylene | 2.8 |
| Carbon monoxide | 1 |
| Hydrogen | 27.4 |
| Methane | 61.8 |
| Nitrogen | 6.6 |

What I claim is:

In the conversion of a gas essentially comprising methane and its higher homologues into olefines and aromatic hydrocarbons, the steps of alternately heating by heat regeneration in a Cowper furnace a refractory material comprising between 60 and 95% of silicon carbide, the remainder being a binding agent of feldspathic nature selected from the class consisting of feldspars, cryolites, and fluorspars to a temperature between 700 and 900° C., contacting said gas with said heated refractory material, removing the unsaturates formed, alternately heating by heat regeneration said refractory material to a temperature between 900 and 1300° C. and contacting the residual gas with said heated refractory material.

PAUL FEILER.